Patented Oct. 28, 1924.

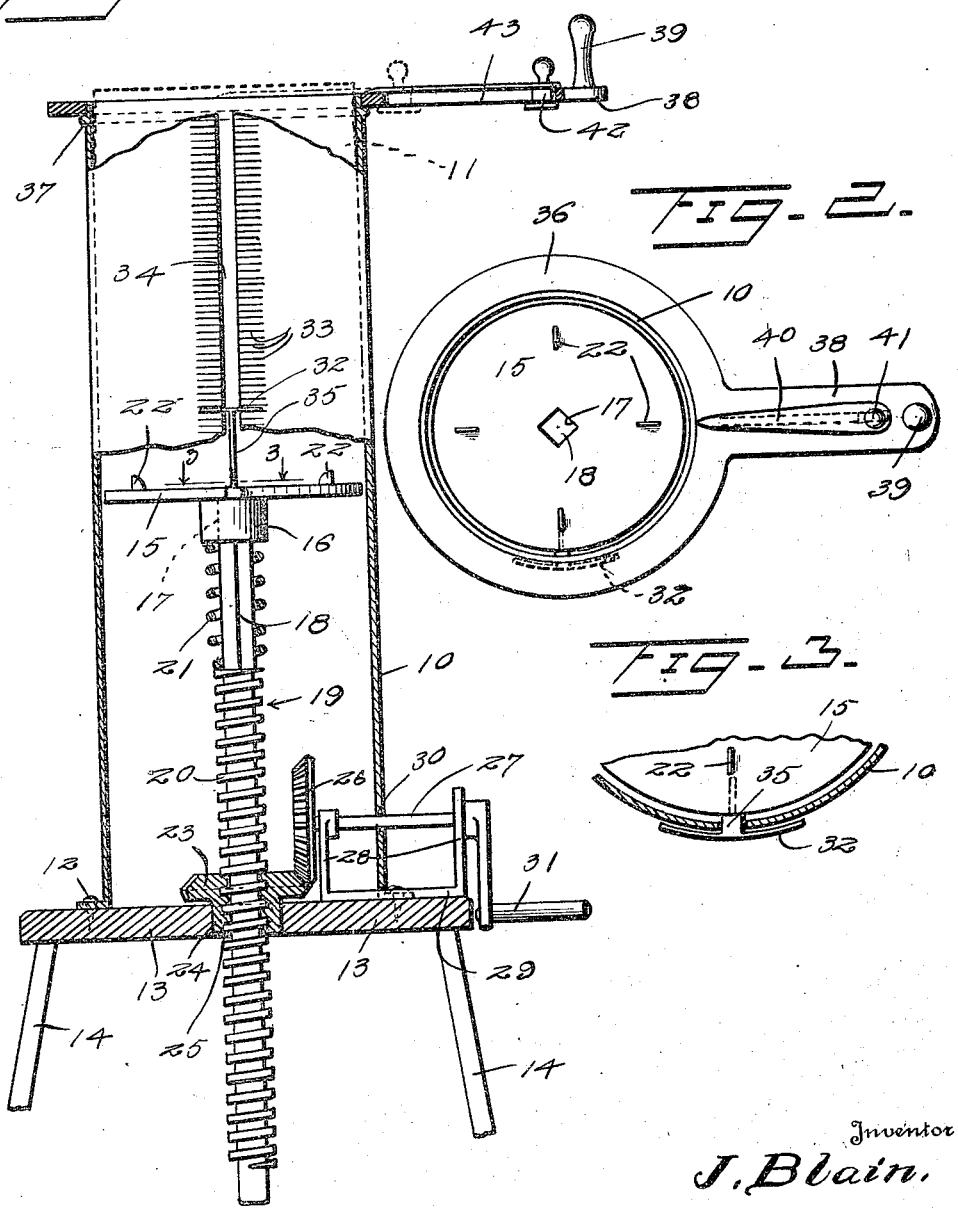

1,513,476

UNITED STATES PATENT OFFICE.

JAMES BLAIN, OF SPRINGFIELD, MISSOURI.

CHEESE CUTTER.

Application filed September 29, 1923. Serial No. 665,561.

*To all whom it may concern:*

Be it known that I, JAMES BLAIN, a citizen of the United States, residing at Springfield, in the county of Greene and State of Missouri, have invented certain new and useful Improvements in a Cheese Cutter; and I do hereby declare the following to be a full, clear, and exact description of the invention, such as will enable others skilled in the art to which it appertains to make and use the same.

This invention relates to a cheese cutter.

It is aimed to provide a novel and efficient construction whereby cheese, particularly Longhorn cheese may be rapidly and efficiently cut so as to produce a slice of the exact weight desired.

Another object is to provide a construction wherein a feeding means for the cheese will indicate the depth at which it will be cut in combination with a cutter movable into and out of the path of feeding of the cheese so as not to interfere with the feeding of the latter.

Various additional objects and advantages will become apparent from a consideration of the description following taken in connection with accompanying drawings illustrating an operative embodiment.

In said drawings:—

Figure 1 is a view of the apparatus substantially in central vertical section;

Figure 2 is a plan view of the apparatus, and

Figure 3 is a sectional view taken on the line 3—3 of Figure 1.

Like reference characters designate like or similar parts in the different views.

In carrying out the invention, a casing or drum 10 is suitably mounted so as to removably receive Longhorn cheese or cheese in a cylindrical cake or otherwise as suggested at 11. Said drum therefore is preferably cylindrical. The drum 10 is fastened as at 12 to a base 13, which may be a counter, table or the like, or supported by individual legs as at 14.

Movable longitudinally of and within the drum 10 is a supporting plate and follower 15 for the cheese cake 11. Plate 15 has a depending collar 16 provided with a bore or recess 17 detachably receiving the adjacent square end portion 18 of a feed screw 19 having screw threads as at 20. A coil spring 21 surrounds the portion 18 and bears at one end against the threads 20 and at the other end against the collar 16, preventing the upper end of portion 18 from engaging the base of the recess 17 and thus to some extent resiliently supporting the plate 15. Plate 15 has spurs or the like at 22 in order to penetrate the cheese and thus hold it against turning independently of the plate.

A beveled gear wheel is provided at 23 having a depending collar at 24 journaled in the base 13. The feed screw 19 passes through the gear wheel 23 and is in screw threaded relation therewith at 25. Meshing with the teeth of gear wheel 23 is a beveled gear wheel 26 carried by a shaft 27 journaled in the arm 28 of a substantially U-shaped bracket 29 fastening to the base 13. The bracket 29 is overlapped by the wall of the drum 10 and the shaft 27 is also journaled in said wall as at 30. An operating crank handle 31 is fastened to the shaft 27.

As the follower plate 15 moves, the extent that the cheese cake 11 projects above the drum 10 may be observed by reference to the position of an indicator 32 with respect to indicator 33 provided exteriorly of the drum and on opposite sides of an elongated slot 34 thereof. Indicator 33 is carried by an arm 35 extending from plate 15 and through the slot 34.

A cutter frame 36, of annular form, is journaled about the exterior of the drum 10 and has its upper surface flush with the upper end of said drum. The lower surface of the frame 36 rests on a ledge or flange 37 extending outwardly from and integral with the drum 10. An operating arm 38 extends outwardly from the frame 36 and has an upstanding handle or grip 39 to facilitate its operation. The cutter blade 40 is carried by the arm 38, being slidable along said arm diametrically of the drum and through engagement of the knob 41 extending therefrom. Depending from the blade 40 in line with the knob 41 is a guide block 42 of substantially the same width as an elongated slot 43 in the arm 38 and which is slidable in said slot and prevents the knife from turning independently of the frame 36 but which permits movement of the knife radially of the drum.

It will be realized that both the frame 36 and the plate 15, as well as the feedscrew, are removable so that the same may be washed at desired times and kept extremely sanitary.

In using the apparatus, the cheese cake 11 is placed in the drum 10 through the top so that it rests on the plate 15 and is penetrated by the spurs 22. The handle 31 is then turned so as to rotate shaft 27, gear wheel 26, gear wheel 23, and the latter to raise or lower the screw 20 and elevate the same together with the plate 15, thus projecting the cheese cake above the upper end of the drum. The extent of projection may be gaged and observed by the relative position of the indicator 32 with respect to the indicators 33. When the cheese has been elevated to the desired extent, the knob 41 is engaged by the operator and moved toward the axis of the drum 10 thus forcing the knife 40 into the cheese. Thereupon, the handle or grip 39 is rotated and the ring 36 swung 360° to the end that the portion of the cheese projecting above the drum 10 will be severed. It will be noted that the knife 40 has firm support and intimate contact on the upper edge of the drum 10 and arm 43 during the turning movement of the frame 36.

The knife 40 may be of any suitable construction but preferably tapers to a point at its distal end and is preferably sharpened on both of its longitudinal edges.

Various changes may be resorted to provided they fall within the spirit and scope of the invention.

Having thus described the invention, what I claim is:—

1. A machine of the class described having a drum to contain the material, and a cutter for the material having contact with an end wall of the drum, and movable circumferentially of the drum.

2. A machine of the class described having a drum to contain the material, and a cutter for the material having contact with an end wall of the drum, and the cutter being movable radially with respect to the drum into and out of operative relation through the material.

3. In a machine of the class described having a drum to contain the material, a frame journaled on the drum, and a cutter carried by the frame and movable into and out of the path of the material independently of movement of the frame.

4. A machine of the class described having a drum to contain the material, a frame journaled on the drum adjacent one end thereof, supporting means for the frame on the drum, an arm extending from the frame, the upper surface of the arm and frame being flush with the adjacent end at the drum, said arm having an elongated slot, a cutter in contact with the upper surface of the arm, and guide means for the cutter extending from the latter and movable in said slot.

5. A machine of the class described having a base, a drum rising therefrom, a plate to feed material toward and above its upper end, a feed screw carrying said plate, a gear wheel journaled in said base and threaded to said screw, means to operate said gear wheel, a frame rotatably mounted on the drum adjacent its upper end, and a knife carried by the frame to engage the material.

6. A machine of the class described having a base, a drum rising therefrom, a plate to feed material toward and above its upper end, a feed screw carrying said plate, a gear wheel journaled in said base and threaded to said screw, means to operate said gear wheel, a frame journaled on the drum adjacent its upper end, and a knife carried by the frame to engage the material, said plate having material-engaging spurs, an indicator having an arm extending from the plate, the drum having a slot in which said arm operates and indications to coact with the indicator, a socket depending from the plate, said socket having detachable connection with the feed screw, and a cushioning spring surrounding the feed screw and engaging said socket at one end and the thread of the screw at its other end.

In testimony whereof I affix my signature in presence of two witnesses.

JAMES BLAIN.

Witnesses:
PAUL E. CADUC,
S. E. WILLIAMS.